July 22, 1941.  C. H. WHITE  2,249,874
FERTILIZER DISTRIBUTOR ATTACHMENT
Filed Sept. 3, 1937
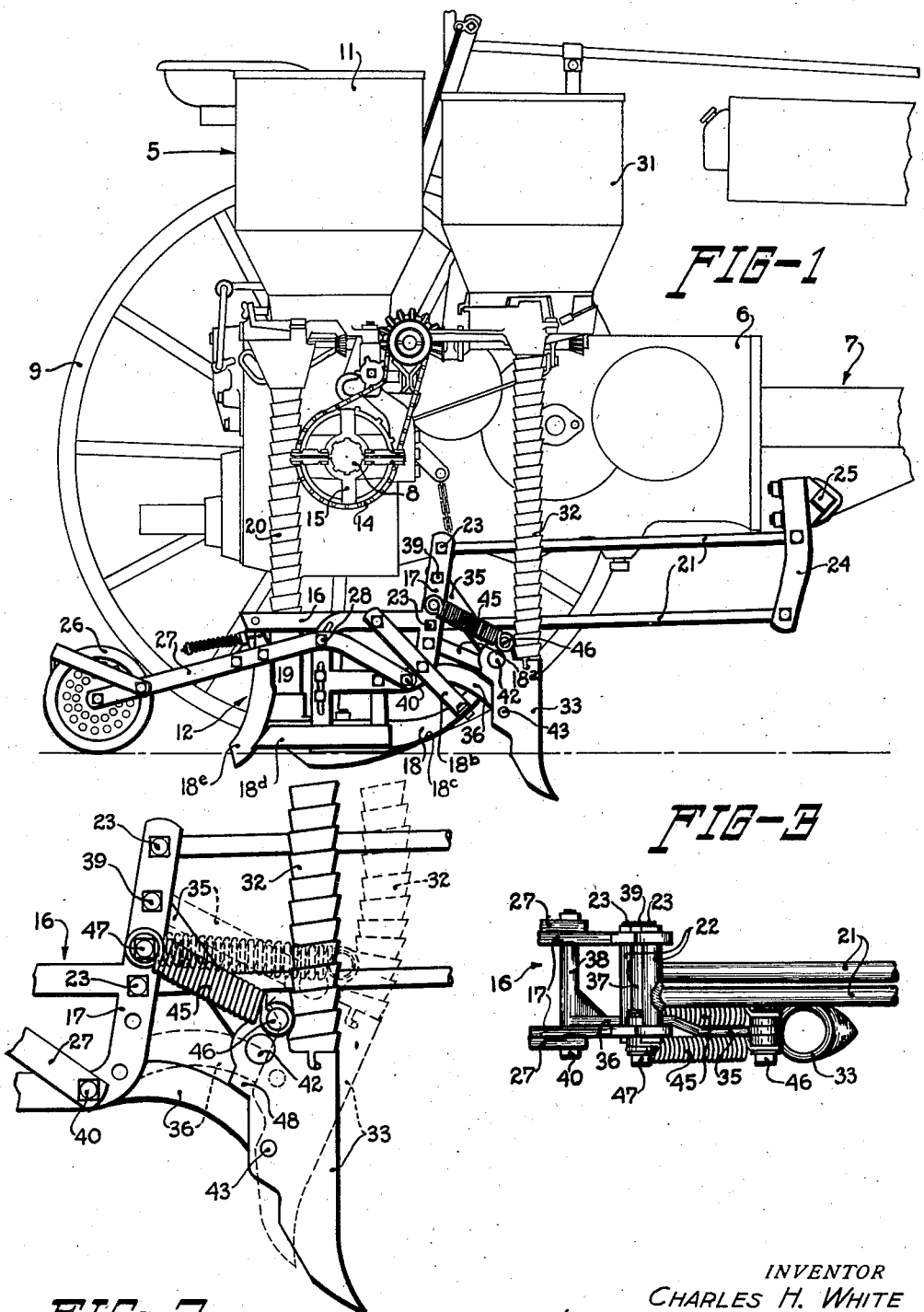
INVENTOR
CHARLES H. WHITE
BY
ATTORNEY Patented July 22, 1941

2,249,874

UNITED STATES PATENT OFFICE 2,249,874

FERTILIZER DISTRIBUTOR ATTACHMENT

Charles H. White, Moline, Ill., assignor to Deere & Company, Moline, Ill., a corporation of Illinois Application September 3, 1937, Serial No. 162,256

16 Claims. (Cl. 111—62)

My invention relates generally to spring trips for fertilizer or planter boots, cultivator shovels and the like, and has for its principal object to provide a support for the distributing boot or shovel which will permit the lower end thereof to move rearwardly and upwardly in a curved path to enable the boot to pass over a stone or other obstruction which may be embedded in the ground.

In the present instance I have incorporated the novel features of my structure in a fertilizer distributor attachment mounted on the front of a corn planting mechanism frame which is adapted to deposit fertilizer in the ground at the time of the planting of the seed.

In the conventional design of corn planter which is provided with a fertilizer distributor attachment of this type, the furrow opener or boot of the fertilizer distributor is usually offset slightly laterally and positioned at a greater depth than the furrow opener of the planter so that the fertilizer will not come in contact with the seed. It has been found in practice that the fertilizer distributor boot frequently encounters stones, roots, or other foreign objects which are embedded in the ground and sometimes serious damage occurs as a result thereof. It is therefore another object of my present invention to support the fertilizer distributing boot on the frame of the planting mechanism in such a manner that the boot may be automatically raised out of the ground when it meets with an obstruction and thereby prevent damage occurring thereto.

A still further object of the invention is to provide a yielding connection between the planting mechanism frame and the fertilizer distributor boot which is adapted to normally hold the boot in vertical or operating position but which will permit the boot to move out of the ground upon striking a stone or similar foreign object, and will return the boot to normal operating position after the obstruction has been passed.

Other objects and advantages of my invention will be apparent to those skilled in the art to which this implement pertains after a consideration of the following detailed description, taken in conjunction with the accompanying drawing illustrating the preferred construction.

In the drawing:

Figure 1 is a fragmentary side elevational view of a tractor to which is attached a corn planter having a fertilizer distributor mounted thereon, the adjacent rear wheel of the tractor being removed so as to not obstruct the view of the implement.

Figure 2 is an enlarged detail side view showing the supporting means employed to attach the fertilizer distributor boot to the frame of the planting mechanism; and Figure 3 is a fragmentary plan view of the portion of the structure shown in Figure 2.

The corn planter 5, on which I have incorporated the novel features of my invention in the present instance, is of the integral tractor type of the type generally shown and described in my prior Patent No. 2,210,994, issued August 13, 1940, and is mounted on the body portion 6 of a tractor 7. The body portion 6 of the tractor is supported at its rear end on a drive axle 8 which is carried on drive wheels 9, and at its front end on steering wheels (not shown).

The corn planter 5 comprises a seed hopper unit 11 having a seed selecting mechanism (not shown) provided in the bottom thereof, and a planting unit 12. The hopper unit 11 is mounted above the body portion 6 on suitable brackets provided for this purpose. The seed selecting mechanism is operated by a chain 14 which is driven by a drive sprocket 15 mounted on the axle 8. The planting unit 12 is attached to the under side of the body portion 6 and serves to deposit the seed in the ground. The planting unit 12 comprises a frame structure 16 which includes a pair of spaced side members 17 between which is disposed, adjacent their lower edges, a furrow opener blade or runner 18. The runner 18 is supported at its front end by braces 18a and 18b which are secured to the runner 18 and to the sides 17 of the frame 16. The runner 18 and braces 18a and 18b have been omitted from Figure 2 of the drawing in order to more clearly show other parts of the structure. A seed boot or spout 19 is provided between the side members 17 rearward of the blade 18. The seed is conducted from the seed selecting mechanism to the boot 19 by means of a flexible tube 20, which extends between these two members.

The planting unit 12 is connected to the body portion 6 of the tractor 7 by means of parallel links or draft bars 21 which are secured at their rear ends on sleeves 22 disposed between the side members 17 and journaled on pivot bolts 23 which extend through aligned holes in these members. The front ends of the draft bars 21 are pivotally connected to a depending arm 24 which is secured to a bracket 25 fixedly supported on the side of the body portion 6. When the planter 5 is in operation, the planting unit 12 floats over the ground, the lower portion of the runner 18 extending below the surface of the ground to open a furrow to receive the seed. The planting unit is maintained in proper position by the parallel links 21. To limit the depth to which the runner 18 may enter the ground in order to plant the seed at a uniform depth, a depth limiting shoe 18c is provided. The shoe 18c is in the form of a horizontal plate which extends laterally from each side of the runner 18 and rides upon the upper surface of the ground. The front end of the shoe 18c is curved upward to enable it to ride over stones. A horizontal side wing member 18d is attached to each side of the runner 18 and covering blades 18e are provided at the rear of the runner 18 in the usual way.

A press wheel 26 is provided at the rear of the boot 19 and is mounted between supporting bars 27 which are adjustably secured on the frame 16 by bolts 40 and 28.

The fertilizer distributor attachment includes a hopper 31 which is mounted above the body portion 6 forwardly of the seed hopper 11, which is provided with the usual fertilizer dispensing mechanism arranged in the bottom of the hopper. A flexible tube 32 conducts the fertilizer from the hopper 31 to a boot 33 which is disposed adjacent the front end of the planting unit 12. The boot 33 is supported on upper and lower links 35 and 36 respectively. The rear ends of the links 35 and 36 are welded or otherwise secured to horizontal sleeves 37 and 38 which are disposed between the side members 17 on pivot bolts 39 and 40, which extend through aligned holes provided in the side members 17 adjacent the front end thereof. The front ends of the links 35 and 36 are pivoted on pivot pins 42 and 43, respectively, which are provided in the fertilizer boot 33 adjacent the rear side thereof.

The boot 33 is normally yieldingly held in vertical position so that as the implement is operated, the fertilizer may drop downwardly by gravity through the boot into the ground. To facilitate this a pair of springs 45 are provided, the front ends of which are attached to a pin 46 secured in the upper end of the boot 33 and at their rear ends to a bolt 47 which extends through aligned holes provided adjacent the front end of the side members 17 of the planting unit 12. To prevent the springs 45 from drawing the boot 33 beyond the vertical position, a stop 48 is provided on the boot which engages the link 36 to ensure against further movement in this direction. The springs 45 are under sufficient tension to normally hold the boot 33 in a vertical operating position but may yield to permit the boot to move rearwardly and upwardly when it encounters an obstruction.

The pivots 39, 40, 42 and 43 are spaced at unequal distances apart so that the links 35 and 36 will be disposed in non-parallel relation. With this arrangement, when the boot 33 encounters a stone, root, or other foreign object, it is moved upwardly and rearwardly against the tension of the springs 45 with the lower end of the boot following a curved path. This upward and rearward movement of the boot 33 serves to lift it over the obstruction, thereby reducing the pressure against the boot and greatly lessening the liability of breakage thereto. A further advantage of the present arrangement is that when the boot 33 is in a vertical operating position, the springs 45 are exerting the least amount of force. At this time the leverage against the springs is also relatively short. As the boot 33 moves upwardly and rearwardly to pass over an obstruction, the tension of the springs 45 increases. However, as the boot 33 moves upwardly, the leverage against the springs increases proportionately with the increase of the tension of the springs, so that the pressure against the boot 33 is approximately constant.

From the foregoing description it will be understood that the furrow opener or boot 33 will be positively held in vertical operating position under normal conditions, but may, upon striking a root, stone, or other foreign object, yield upwardly and rearwardly to pass over the obstruction. In order to reduce to a minimum the possibility of breakage to the boot 33, the entire boot begins to move upwardly immediately upon striking an obstruction. Also as the boot is raised, the lower end or point thereof recedes or moves rearwardly in a direction away from the obstruction, permitting it to pass over the obstruction and thereby prevent breakage or other damage to the boot and supporting parts. The advantage of moving the entire boot 33 upward away from the obstruction will be apparent from the foregoing description as this enables the boot to pass over the top of the obstruction rather than to be dragged over it as would be the case if the boot were mounted in some other manner, as for instance if it were pivoted at its upper end and adapted to merely swing about this pivot to clear an obstruction.

While I prefer to embody my invention as specifically illustrated and described herein, I wish it to be understood that it is not limited to such specific construction, except insofar as the claims may be directed thereto, as it will be apparent that various changes and modifications of such structure may be made without departing from the invention pointed out in the generic claims.

What I claim is:

1. For use with a planting mechanism comprising a frame, the combination of a fertilizer distributing attachment having a boot disposed forwardly of said frame, and a pair of non-parallel links pivotally connected at opposite ends thereof to said frame and said boot, respectively, said links being adapted to normally arrange said boot in a vertical operating position and to permit the lower end of said boot to move in a path which curves rearwardly and upwardly from said normal operating position.

2. For use with a planting mechanism comprising a frame, the combination of a fertilizer distributing attachment having a boot disposed forwardly of said frame, a pair of links pivotally connected at opposite ends thereof to said frame and said boot, respectively, said links being adapted to normally arrange said boot in a vertical operating position, and to permit said boot to move upwardly, the lower end of said boot moving in a path which curves rearwardly and upwardly from said normal operating position, and resilient means between said frame and said boot to urge said boot into said operating position.

3. The combination with an implement frame, of a soil engaging member disposed forwardly of said frame, and means for supporting said soil engaging member in a vertical operating position, including a pair of non-parallel links connected at opposite ends thereof to said member and to said frame, respectively, said means adapted to yield to permit said soil engaging member to move upwardly and the lower end of said soil engaging member to move rearwardly and upwardly in a predetermined curved path.

4. In combination, a frame, a fertilizer distributor boot, means for supporting said boot on said frame including a pair of non-parallel links connected at opposite ends thereof to said member and to said frame, respectively, said means adapted to normally arrange said boot in a vertical operating position, and being so arranged as to permit the entire boot to move upwardly in such a manner that the lower end of said boot moves in a path which curves rearwardly and upwardly from said operating position, and resilient means to yieldingly hold said boot in said vertical operating position.

5. In combination, a frame, a fertilizer boot, a pair of non-parallel links pivotally connected to said frame and said boot, said links adapted to normally arrange said boot in a vertical operating position, and to permit the entire boot to move upwardly into an inclined position, and resilient means to yieldingly hold said boot in said operating position.

6. The combination with a planting mechanism comprising a frame having a furrow opener blade adapted to extend into the ground, of a fertilizer boot, a pair of links pivotally connected to said frame and said boot and adapted to normally arrange said boot in a vertical operating position with its lower end disposed at a greater depth than said blade, and resilient means connected to said frame and said boot to normally hold said boot in said operating position and fixed relative to said blade but being yieldable to permit said boot to move upwardly to a position out of engagement with the ground when the boot meets with an obstruction.

7. The combination with a wheel supported frame, of a planter frame, draft means connecting said planter frame with said wheel supported frame for floating movement relative thereto, a ground engaging planting tool mounted on said planter frame, a fertilizer distributor boot, link means separate from said draft means swingably connecting said boot with one of said frames so that relative generally vertical floating movement between said boot and both of said frames is accommodated, and spring means connected at one end to said planter frame and at its other end to said boot for normally preventing the latter from swinging generally vertically relative to said planter frame but adapted to yield to an excessive force against said boot to permit the latter to swing generally upwardly relative to said planter frame.

8. The combination defined in claim 7, further characterized by said draft means comprising a pair of links connecting said planter frame with said wheel supported frame, said link means comprising a second pair of links pivotally connecting said fertilizer distributor boot with said planter frame, and said spring means engaging the plunger frame between said first mentioned links and operative to cause said boot to swing downwardly under control of said second mentioned links.

9. The combination with a tractor and a planting implement including a planter frame, a furrow opener blade fixed thereto, and draft means pivotally connecting said planter frame to said tractor providing for floating movement of said frame relative to the tractor, of a fertilizer distributor boot connected to said planter frame for swinging movement into and out of ground penetrating position, a pair of non-parallel links pivotally connected to said frame and said boot, said links adapted to normally arrange said boot in a vertical operating position, and to permit the entire boot to move upwardly into an inclined position, and spring means to yieldingly hold said boot in said operating position and normally fixed relative to said frame.

10. In combination, a frame, a ground engaging tool, means including a pair of links pivotally connected with said frame and said tool for supporting the latter for generally vertical swinging movement, spring means acting to resist upward swinging movement of said links and said tool, and means on said tool engageable with one of said links to limit the downward swinging movement of said tool relative to said frame.

11. In combination, a frame, a ground engaging tool movable in a generally fore and aft direction relative to said frame, and means swingably supporting said tool on said frame including a pair of vertically spaced links pivotally connected at vertically spaced points to said frame, and means pivotally connecting the opposite ends of said links to said tool at points vertically spaced closer together than said spaced points of connection to the frame, and means for yieldingly holding said tool against swinging movement relative to said frame whereby said tool is normally rigid relative to said frame during operation.

12. For use with a planting mechanism comprising a frame, the combination of a fertilizer attachment having a boot disposed forwardly of said frame and supported thereon by means including a pair of vertically spaced links pivotally connected at vertically spaced points to said frame and extending forwardly and downwardly in converging relation to points of pivotal connection with said tool, said latter pivots being vertically spaced closer together than said spaced points of connection to the frame, and means for yieldingly holding said tool against swinging movement relative to said frame whereby said tool is normally rigid relative to said frame during operation.

13. The combination with a planting mechanism comprising a frame including two generally laterally disposed frame members, a furrow opener mounted generally centrally therebetween, a fertilizer distributor boot, and means operatively connecting said boot with said planter frame comprising a pair of links and associated means maintaining said fertilizer boot substantially in front of one of said planter frame members and spring means extending generally downwardly and forwardly from said one member to said fertilizer boot for maintaining the latter at operating depth relative to said planter frame.

14. The combination with a wheel supported frame, of a planter frame, draft means connecting said planter frame with said wheel supported frame for floating movement relative thereto, a furrow opener carried by said planter frame, ground engaging means comprising a gauge shoe fixed to said planter frame alongside said furrow opener, a fertilizer distributor boot disposed adjacent but forwardly of the forward end of said gauge shoe and furrow opener, draft means for propelling said fertilizer boot through the soil in advance of said furrow opener, including a pair of links providing for generally vertical swinging movement of said fertilizer boot, and spring means yieldingly resisting said generally vertical movement of the seed boot, said spring means being connected between said planter frame and said boot, said gauge shoe serving to determine normally the operating position of both said furrow opener and said fertilizer distributor boot.

15. The combination with a supporting frame, of an implement frame connected therewith for vertical movement relative thereto, a ground engaging tool carried by said implement frame, a second ground engaging tool, means connecting the second tool with the implement frame for generally vertical movement relative to said first tool so that when the second tool encounters an obstruction it can move generally vertically upwardly relative to the first tool, and means yieldingly resisting said relative upward movement with a force which, when relative movement initially occurs, is approximately the same as the effective force near the end of said upward movement.

16. The combination with a planting mechanism comprising a frame including two generally laterally disposed frame members, a furrow opener mounted generally centrally therebetween, a fertilizer distributor boot, means mounting said fertilizer boot for generally vertical movement relative to said furrow opener and serving to maintain said fertilizer boot substantially in front of one of said planter frame members, and spring means extending from said one member to said fertilizer boot for maintaining the latter at operating depth relative to said planter frame.

CHARLES H. WHITE.